(12) United States Patent
Taylor-Smith (10) Patent No.: US 6,375,912 B1
(45) Date of Patent: Apr. 23, 2002

(54) ELECTROCHEMICAL ABATEMENT OF PERFLUORINATED COMPOUNDS

(75) Inventor: Ralph E Taylor-Smith, Dunellen, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/469,090

(22) Filed: Dec. 21, 1999

Related U.S. Application Data
(60) Provisional application No. 60/149,036, filed on Aug. 16, 1999.

(51) Int. Cl.$^7$ .......................... B01D 53/68; B01D 53/70
(52) U.S. Cl. .............................. 423/240 R; 423/240 S; 423/245.1; 423/245.2; 423/235; 588/205; 588/206
(58) Field of Search .................. 423/240 R, 240 S, 423/235, 245.1, 245.2, 210; 588/205, 206

(56) References Cited

U.S. PATENT DOCUMENTS

| | | | | |
|---|---|---|---|---|
| 4,130,629 A | * | 12/1978 | Velenovsky et al. | 588/206 |
| 5,110,364 A | * | 5/1992 | Mazur et al. | 134/2 |
| 5,260,496 A | * | 11/1993 | Meinert et al. | 570/179 |
| 5,352,785 A | * | 10/1994 | Herzberg et al. | 544/178 |
| 5,453,125 A | | 9/1995 | Krogh | 118/723 |
| 5,497,627 A | | 3/1996 | Heyduk et al. | 62/85 |
| 5,779,998 A | * | 7/1998 | Tom | 423/240 R |
| 5,817,284 A | * | 10/1998 | Nakano et al. | 423/240 S |

FOREIGN PATENT DOCUMENTS

| | | | | |
|---|---|---|---|---|
| EP | 0666101 A | | 8/1995 | |
| EP | 0764458 A | | 3/1997 | |
| FR | 1477742 | * | 4/1967 | ............. 423/240 R |
| WO | WO 96/08323 | | 3/1996 | |

OTHER PUBLICATIONS

Pierce, A.M. et al, "Effectiveness Of An Inwardly Fired Burner On Abatement Of PFCs", *Mat. Res. Soc. Symp. Proc.*, vol. 447, pp. 49–54 (1997), no month.

Harzt, C.L. et al., "Innovative Surface Wave Plasma Reactor Technique for PFC Abatement", *Environmental Science & Technology*, vol. 32, No. 5, pp. 682–687 (1998).

Mocella, M.T. et al., "PFC Emission control Optons For Plasma Processing Tools: A Current Assessment", *Mat. Res. Soc. Symp. Proc.* vol. 447, pp. 29–34 (1997).

Williams, J.D., "Environmental Issues Of Perfluorocompounds In The Semiconductor Industry", *Mat. Res. Soc. Symp. Proc.*, vol. 447, pp. 43–48 (1997), no month.

Voss, K.E., "Materials and Processes for Environmental Protection", *Materials Research Society Symposia Proceedings*, vol. 344, pp. 255–258 (1994) no month.

Mocella, M.T. et al., "Options For environmentally Impacted Perfluorinated Gases Used In Plasma Processing", *Proceedings of the Electrochemical Society*, vol. 94–20, pp. 192–200 (Nov. 1994).

(List continued on next page.)

*Primary Examiner*—Ngoc-Yen Nguyen
(74) *Attorney, Agent, or Firm*—Scott J. Rittman (57) ABSTRACT

The invention provides an improved point-of-use PFC/HFC abatement process involving an electrochemical route to abatement. PFCs/HFCs are treated with a relatively strong chemical reducing agent, typically an alkali such as lithium, potassium, or sodium, in a system that promotes ionization of the alkali, e.g., by inclusion of ammonia or other compound that promotes dissolution of the alkali to ions. The electrochemical potential arising from the ionization process provides sufficient energy to extract the fluorine atoms from the PFCs/HFCs. The system also contains a weak acid proton donor to provide a hydrogenation source. The weak acid is believed to displace the reaction equilibrium by protonation, to allow the reaction to proceed at a sufficient rate.

15 Claims, 6 Drawing Sheets

OTHER PUBLICATIONS

Taylor–Smith, R.E., et al., "Emerging Strategies For Environmental Control Of Perflurocompounds In Semiconductor Manufacturing", 29$^{th}$ International SAMPE Technical Conference, pp. 424–433 (1997), no month.

Normile, D., "It's Official: First Glimmer of Greenhouse Warming Seen", *Science,* vol. 270, (1995).

Kerr, R.A., "U.S. Climate Tilts Toward the Greenhouse", *Science,* vol. 268 (1995), no month.

Maroulis, P. et al., "PFCs and the Semiconductor Industry: A Closer Look", *Semiconductor International,* (1994).

Ravishankara, A.R., et al., "Atmospheric Lifetimes of Long–Lived Halogenated Species", *Science,* vol. 259 (1993).

Roehl, C.M. et al., "Infrared band intensities and global warming potentials of $CF_4$, $C_2F_6$, $C_3F_8$, $C_4F_{10}$, $C_5F_{12}$, and $C_6F_{14}$", *Geophysical Research Letters,* vol. 22, No. 7, pp. 815–818 (1995), no month.

Climate Change, State of Knowledge (Feb. 1995).

\* cited by examiner

ELECTROCHEMICAL ABATEMENT OF PERFLUORINATED COMPOUNDS

CROSS-REFERENCE TO RELATED APPLICATION

This application claims priority of Provisional Application Ser. No. 60/149,036 which was filed Aug. 16, 1999.

BACKGROUND OF THE INVENTION

1. Field of the Invention

The invention relates to abatement of perfluorinated and hydrofluorinated compounds, in particular compounds typically used in semiconductor manufacture.

2. Discussion of the Related Art

Perfluorinated compounds (PFCs), which include $CF_4$, $C_2F_6$, $C_3F_6$, $SF_6$, and $NF_3$, and hydrofluorinated compounds (HFCs), which include $HCF_3$, are widely utilized as dry etchants in plasma processing within the semiconductor industry. These compounds are important reagents in current silicon-based processes—they are used extensively in plasma etching of wafers and in the cleaning of process tool-chamber interiors after plasma-enhanced chemical vapor deposition (PECVD). The semiconductor industry is experiencing significant growth in PFC/HFC consumption due to a market-driven expansion in wafer production (higher capacity fabrication lines), an increase in device complexity (higher integration from greater densities and more layers), and, due to increasingly smaller geometries, a general trend from wet (chemical) to dry (plasma) processing.

PFC/HFC-based plasma processes are typically inefficient in terms of reagent utilization, however, with actual utilization highly dependent on the specifics of process conditions and the particular PFC/HFC compounds utilized. Thus, an undesirable portion of unreacted PFC/HFC reagents tend to be emitted as process effluents. Unfortunately, PFCs/HFCs exhibit extremely long atmospheric residence-times and are also strong infrared absorbers. For these reasons, the compounds are believed to contribute to the atmospheric greenhouse effect and global warming. Such concerns have prompted PFC/HFC suppliers, industries that use or generate PFCs/HFCs, and environmental regulatory agencies to monitor and restrict levels of PFC/HFC atmospheric emissions. Numerous control options are under development in an effort to devise an environmentally-benign and cost-effective approach to reduction of atmospheric PFC/HFC emissions.

Some form of abatement technology is expected to constitute the first-line option for PFC/HFC emissions reduction at the IC manufacturing facility level. While various thermal-combustion, catalytic-combustion, and plasma-based PFC/HFC destruction systems are under development, improved abatement systems are actively being sought.

SUMMARY OF THE INVENTION

The invention provides an improved point-of-use PFC/HFC abatement process involving an electrochemical route to abatement. According to the invention, PFCs/HFCs are treated with a relatively strong chemical reducing agent, typically an alkali metal such as lithium, potassium, or sodium, in a system that promotes ionization of the alkali metal, e.g., by inclusion of ammonia or other compound that promotes dissolution of the alkali metal to ions. The electrochemical potential arising from the ionization process provides sufficient energy to extract the fluorine atoms from the PFCs/HFCs. The system also contains a weak acid proton donor to provide a hydrogenation source. Specifically, the weak acid is believed to displace the reaction equilibrium by way of the alkali metal, to allow the reaction to proceed at a sufficient rate. And continuous $F^-$ removal via formation of insoluble alkali metal-F precipitates (e.g., NaF) appears to provide the driving force to achieve formation of successively, and completely, reduced species. In particular, decomposition of fluorocarbon PFCs/HFCs is believed to occur primarily by fission at the carbon-halogen bond with subsequent proton addition, thereby generating a carbon-hydrogen bond. (See, e.g., FIG. 1.) Typically, this abatement system is contained in a fluidized bed to promote effective mixing, i.e., gas-liquid intermingling, of system reagents, which provides desirable reaction efficiency.

The weak acid is typically an alcohol (particularly an aliphatic alcohol) or an amine. Ethanol and t-butanol have been found to be useful. (Weak acid indicates a pKa between 14 and 22.) Strong acids would be expected to undesirably promote hydrogen evolution as a side reaction, which would reduce reduction efficiency, and thus the weak acid is believed to provide desirable properties. Sodium is an advantageous reducing agent, with contemplated sodium-containing compounds including NAK (sodium potassium alloy), sodium biphenyl, sodium borohydride, sodium benzophenone, as well as molten metal technology such as molten sodium dispersions. Lithium analogs of these sodium compounds are also possible. Suitable dissolution agents, in addition to ammonia, include low molecular weight aliphatic primary or secondary amines, where low indicates less than 10 carbon atoms. Examples include ethylamine, methylamine, isopropylamine, ethylenediamine, and butylamine. A typical reducing agent/dissolution agent/weak acid system, particularly suitable for fluorocarbon PFCs/HFCs, is sodium/ammonia/ethanol.

DETAILED DESCRIPTION OF THE INVENTION

According to the invention, PFCs/HFCs are treated with a relatively strong chemical reducing agent, typically an alkali metal such as lithium, potassium, or sodium, in a system that promotes ionization of the alkali, e.g., by inclusion of ammonia or other compound (hereafter referred to as a dissolution agent) that promotes dissolution of the alkali to ions. The electrochemical potential arising from the ionization process provides sufficient energy to extract the fluorine atoms from the PFCs/HFCs. The system also contains a weak acid proton donor to provide a hydrogenation source. The weak acid is believed to displace the reaction equilibrium by protonation, to allow the reaction to proceed at a sufficient rate.

This reducing agent generated by the system is typically referred to in the art as a dissolving-metal reducing agent, since the metal dissolves to create the electrochemical redox environment. It is possible to consider this dissolving-metal reducing agent essentially as a solvated mixture of the alkali metal cation and its electrons. Sodium-containing compounds are particularly desirable, e.g., NAK (sodium potassium alloy), sodium biphenyl, sodium borohydride, sodium benzophenone, as well as molten metal technology such as molten sodium dispersions. Useful weak acids include aliphatic alcohols and amines. Ethanol and t-butanol are particularly suitable. Suitable dissolution agents include low molecular weight aliphatic primary or secondary amines, where low indicates less than 10 carbon atoms. Examples include ethylamine, methylamine, isopropylan-line, ethylenediamine, and butylamine. It is possible for such amines to act as both the dissolution agent and the proton donor.

It is also possible to include in the system one or more non-reactive co-solvents to improve the solubility of the system (non-reactive indicating that the co-solvent does not tend to dissociate, ionize, or otherwise affect the electrochemistry of the system). Useful non-reactive co-solvents include ethers, such as tetrahydrofuran, dioxane, and diethyl ether.

The invention is particularly useful for abatement of fluorocarbon PFCs/HFCs. It is contemplated that fluorocarbon PFCs/HFCs potentially react by five distinct potential pathways under exposure to a strong chemical reducing environment: (1) fission at the carbon-halogen bond with subsequent proton addition, generating a carbon-hydrogen bond; (2) fission at the carbon-halogen bond with subsequent oligomer formation via coupling at the carbon/carbon bond; (3) dimerization via a Wurtz-type elimination; (4) halogen displacement by ammonia or amide ion to form an amine; (5) formation of alkenes by the elimination of a hydrogen halide.

It appears that the chemical pathways of (1) and (2) above predominate. Pathway (1), however, is advantageously the primary mechanism, with pathway (2) desirably reduced. Observations have, in fact, primarily shown reductive cleavage to generate the corresponding hydrocarbon bond, and, only under certain conditions, oligomerization via coupling at carbon-carbon sites.

Figure 1:
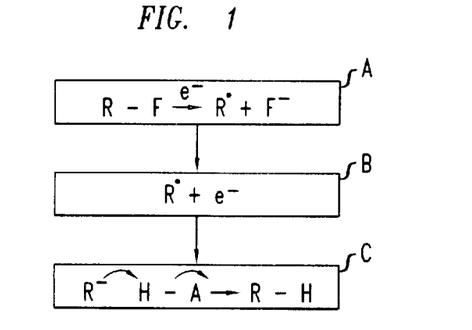
FIG. 1 illustrates the contemplated mechanisms for fluorocarbon PFC decomposition according to the invention.

This contemplated mechanism of (1) is shown in FIG. 1. Generation of the C—H bond takes place via a radical pathway. As reflected in FIG. 1, step A, the initial step is the addition of an electron to the halocarbon (R—F) to generate a carbon radical (R) and a halogen ion (F$^-$). The carbon radical then undergoes a reaction involving addition of another electron to form a carbanion (FIG. 1, step B). As shown in FIG. 1, step C, this carbonanion then abstracts a proton from the weak acid to form a carbon-hydrogen bond (R—H).

The ease at which pathways (1) and (2) will occur depends on the stability of the intermediate radical or anion, with the tendency for oligomerization controlled and minimized through a dilution effect (i.e. low PFC/HFC concentrations). For example, fission of carbon-carbon bonds might only be expected where subsequent fission products were stabilized via resonance delocalization through proximity with a double/triple bond structure such as an aromatic ring or conjugated diene. Because such chemical structures are not typically present within the conventional family of PFC/HFC etch-gas reagents, only selective, site-specific bond fission at the carbon-halogen linkage would be expected in the process of the invention.

As reflected in the computed predictions of Example 1, PFCs/HFCs exhibit increasing energy at successive reduction stages, thereby indicating the significant thermodynamic barrier to complete reduction. Based on this characteristic (although not limiting the invention to any theory), it appears that at least two criteria should be satisfied to successfully attain reduction of these compounds. First, energy supplied to the system should be sufficient to overcome the high activation barrier needed to cleave the carbon-fluorine bond, and thereby generate the radical intermediate. Second, a driving force must exist to propel the reaction system uphill, through successive stages, towards complete PFC/HFC reduction.

The electrochemical system of the invention address these two criteria. Specifically, the high reduction potential from the alkali metal dissolution appears to be sufficient to overcome the initial activation barrier for carbon-fluorine bond cleavage. (Lithium, potassium, and sodium are useful agents, since their relative electrode potential (in volts) is, respectively, $-2.9$, $-2.9$, and $-2.7$.) And continuous F– removal via formation of insoluble alkali metal-F precipitates (e.g., NaF) appears to provide the driving force to achieve formation of successively, and completely, reduced species. useful results have been obtained with an electron concentration of 0.1 to 2 M and a PFC/HFC concentration of about 1 wt. %, although numerous variations in concentrations are possible. Control runs are easily performed to determine appropriate concentrations.

The process of the invention is capable of achieving a reaction efficiency of at least 70%. (Reaction efficiency indicates the percentage of input PFCs/HFCs that are converted.)

The reduction is typically performed in a non-aqueous gas-liquid fluidized bed arrangement, which provides desirable contact between the PFCs/HFCs and the reducing environment. The advantages of this embodiment include (a) the resulting system is simple to operate and engineer, (b) the system is easily scalable to desired capacity during factory implementation, and (c) such a design would readily permit enhanced reaction efficiencies during actual operation through recycle streams and multi-pass configurations. Sodium liquid reagents, by way of example, would be expected to provide useful levels of reaction at relatively moderate temperatures of 50 to 350' C.

Figure 7:
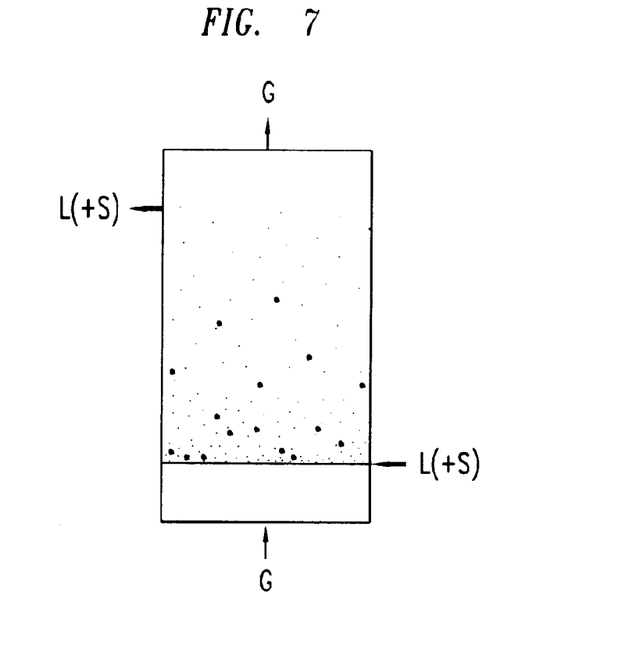
FIG. 7 illustrates a fluidized bed configuration suitable for the invention.

In one suitable embodiment, reflected in FIG. 7, the fluidized bed reactor system is vertically-oriented with cocurrent flow and gas-liquid-solid fluidization. The gas is the PFC or HFC, the liquid contains the reactive agent— dissolved alkali metal, dissolution agent, and weak acid proton-donor, and the solid is an alkali metal. (Specifically, the liquid solution is in a state of super-saturation with undissolved alkali metal or precipitated alkali metal as the solid phase). One example is an alkali metal of sodium, a weak acid of t-butanol, and a dissolution agent of ethylenediamine (b.p. 116.5° C.

In contrast with conventional fixed bed fluidized systems, the solid phase in this embodiment is introduced batchwise into the liquid phase and the system is arranged such that solids charging/discharging is dependent on liquid flow. As shown in FIG. 7, the HFC/PFC gas ("G") and the reactive liquid ("L") flow through the system in a cocurrent manner as shown. The solids ("S") concentration is higher at the bottom of the bed and progressively decreases axially as one moves upwards. The bed surface is ill-defined, with bed expansion during fluidization supported by the liquid phase and the gas bubbles.

Figure 8:
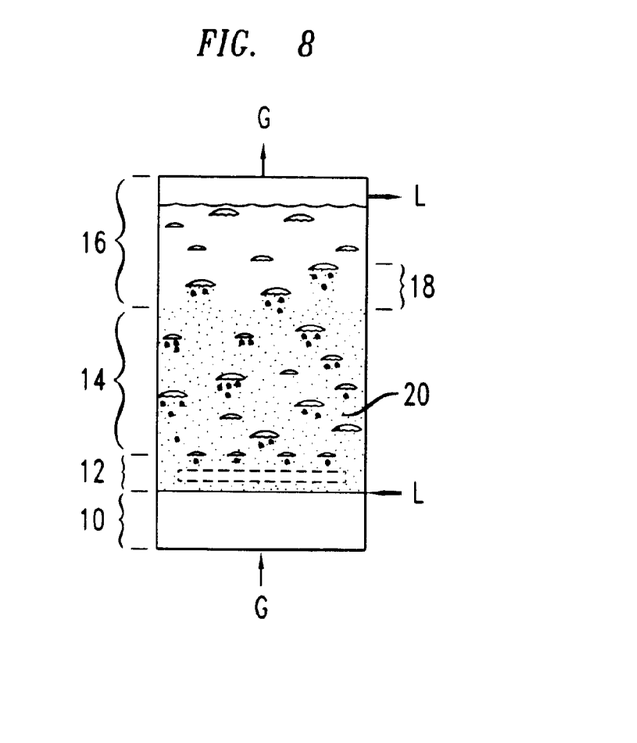
FIG. 8 illustrates the flow mechanics of a fluidized bed configuration such as shown in FIG. 7.

Flow mechanics of this gas-liquid-solid system are illustrated in FIG. 8. For the configuration of this embodiment, the solids density exceeds the liquid density and thus the bed expands upwards, supported by the PFC gas bubbles. The mechanics involve, as recognized in the art, a plenum region 10, a gas-liquid distributor region 12, a bulk fluidized bed region 14, a freeboard region 16, a solid disengagement zone 18, and a solid-liquid fluidization region 20. To achieve particularly desirable reaction efficiencies, it is possible to operate the system at above-ambient temperature, advantageously at a temperature approaching the reflux temperature of the dissolution agent.

In a second embodiment, the fluidized bed PFC-reduction reactor system is a similar, vertically-oriented system with cocurrent flow, but uses only gas-liquid fluidization. In particular, the gas is still the PFC/HFC, but the reactive agent is a liquid alkali metal source, e.g., NAK (Sodium-Potassium Alloy)—which is liquid at ambient temperatures for compositions of 40 to 90 wt. % potassium. A water-free inert atmosphere within the system is important, in this embodiment, for achievement of desirable reaction efficiencies. A suitable weak acid for this embodiment is NaH.

Other reactor configurations, including other fluidized bed reactors, that similarly provide good contact between the PFCs/HFCs and the reducing environment are also possible.

Molecular modeling (as performed in Example 1), indicates that similar electroreduction of the hetero-atom PFCs ($NF_3$, $SF_6$ etc) will occur under suitable conditions.

The invention will be further clarified by the following examples, which are intended to be exemplary.

EXAMPLE 1

Figure 2A:
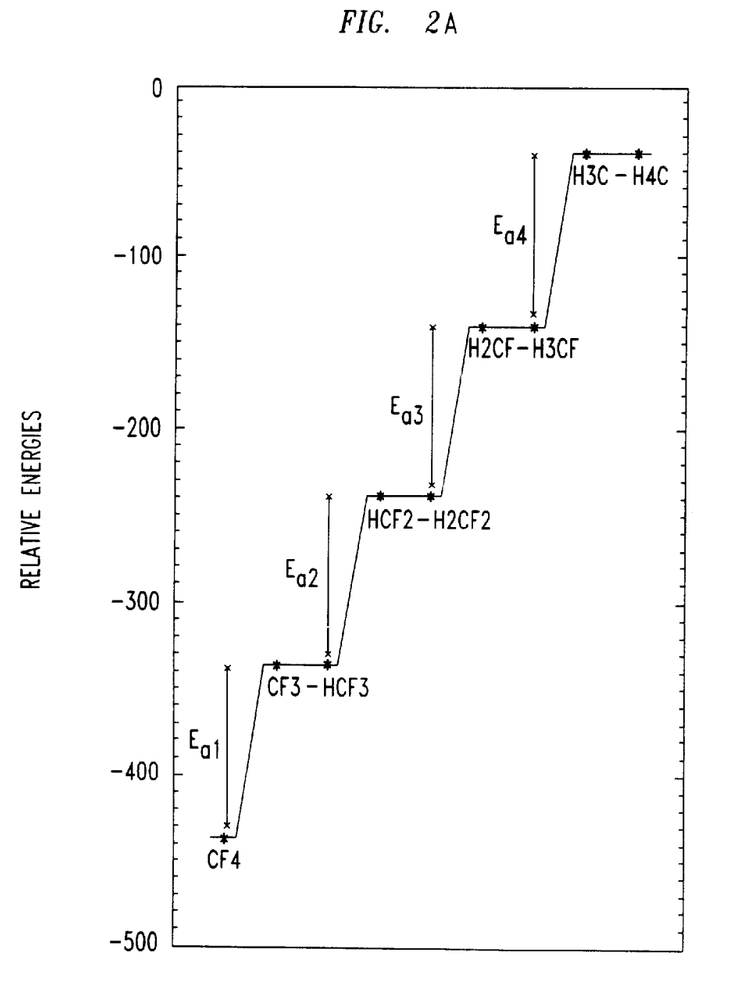
FIGS. 2A and 2B reflect computed energy characteristics of possible reaction products of $CF_4$ and $C_3F_8$, at successive reduction stages.
Figure 2B:
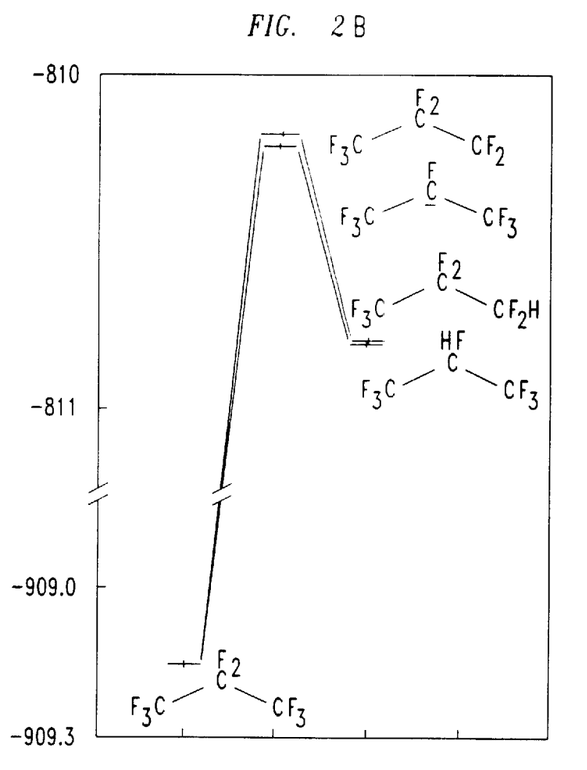

Predictions were generated, for $CF_4$ and $C_3F_8$, for the energetics of possible reaction products at successive stages of reduction to the hydrocarbon analogs, and also potential carbanion intermediates. (Molecular modeling computations were conducted utilizing a commercially available software package, Q-chem, using the 6-31 ++G** basis set and Hartree Fock level of theory.) The computations predicted trends and relative energies of the molecular species. Results for $CF_4$ and $C_3F_8$ are shown in FIGS. 2A and 2B, respectively. These Figures show that the PFC/HFC is always thermodynamically the most stable species. For example, FIG. 2A illustrates that the energy to remove a fluorine ion from the parent $CF_4$ compound (i.e., activation energy—Ea) increases at each successive reduction stage. This effect is believed to be due to the fact that the fluorine loss destabilizes the resultant carbanion. However, the subsequent change in energy upon proton addition is relatively low, implying that direct reduction to the hydrocarbon is feasible if the C—F bond is cleaved. The analogous prediction for the first reduction stage for $C_3F_8$ displayed in FIG. 2B demonstrates that reduction is thermodynamically favored here if the C—F bond is cleaved.

The upward slope to the energetics profile observed in all computed predictions is an indication of the significant thermodynamic barrier to complete reduction. As stated above, due to this characteristic, energy supplied to the system must be sufficient to overcome the high activation barrier needed to cleave the carbon fluorine bond, generating the radical intermediate, and a driving force must exist to propel the reaction system uphill through successive stages towards complete PFC/HFC reduction. Both are met by the process of the invention.

EXAMPLES 2 THROUGH 5

Experimental Procedure

Experiments were performed to allow comparison to the computed models. The experimental set-up involved a five-necked European style flask (1 liter, with three 24/40 joined necks and two #7 threaded necks for insertion of 0.25 inch tubing). The flask was equipped with a dewar condenser (dry ice condenser). Two of the necks were used for gas inlet tubing (0.25 inch stainless steel) and one as a gas outlet. The fifth neck was used for the addition of sodium metal and ethanol (200 proof), or insertion of a thermometer. Ammonia (electronic grade, anhydrous >99.99%, boiling pt. −33.3° C., melting pt. −77.7° C.) was delivered through an inlet at the top of the condenser. Nitrogen gas and the PFC/HFC gases were introduced into the flask using the two inlet necks. The gas inlet tubing extended to the bottom of the flask. Gas delivery was controlled using MKS mass flow controllers calibrated for the specific gases. The outlet gases were first pumped through a long-path gas cell (10 m effective path length) for infrared spectroscopic analysis at a resolution of 4 $cm^{-1}$. A vacuum pump was used to continually lower the pressure to the level necessary for analysis via mass spectroscopy and then a portion of the gas stream was directed into the mass spectrometer. The gaseous product gases were analyzed sequentially via infrared spectroscopy (Bomen MB-154 FT-IR spectrometer equipped with a 10 m long-path gas cell at a resolution of 4 $cm^{-1}$ and analysis with Bomen Grams™/386 software ver. 3.04 level III) and mass spectroscopy UTI model 100C RGA with analysis via Aeroscan™ software ver. 2.31).

The dewar condenser was first charged with dry ice and acetone. The flask was equipped with a glass coated magnetic stir bar, and the flask was placed in a dry ice/ethanol bath. Ammonia gas was allowed to enter through the gas inlet tube at the top of the condenser, and condensed into the reaction flask (condensation point of ammonia is −48° C.). Once enough ammonia had condensed (about 600–700 mL), the ammonia flow was halted. Sodium metal was added to the liquid ammonia until saturation (about 0.2 mol Na/mol $NH_3$), at which point the solution remained dark blue. Nitrogen carrier gas was bubbled into the bottom of the flask at a set rate of 100 standard cubic centimeters per minute (sccm), with the system continuously stirred vigorously to establish intimate gas-liquid contact. The gas outlet tube at the top of the flask was opened and the gas pumped out. The effluent gas was analyzed by mass spectrometry (MS) and infrared spectrometry (FT—IR), and these measurements were considered the background gases.

The PFC/HFC was then bubbled into the bottom of the flask. The rate of flow was 100, 150, and 100 sccm for $CF_4$, $HCF_3$, and $C_3F_8$, respectively. Once the PFCs/HFCs were observed by MS and FT—IR, ethanol was added via the addition neck. For embodiments in which ethanol was added, upon the addition of about 25 mL portions of ethanol, $NH_3$ vapor was observed coming of the surface of the solution in addition to formation of soapy-looking bubbles on the solution surface. The bubbles were coated with a whitish and dark blue film. The effluent gas was analyzed for the appearance of hydrocarbons.

EXAMPLE 2

Figure 3:
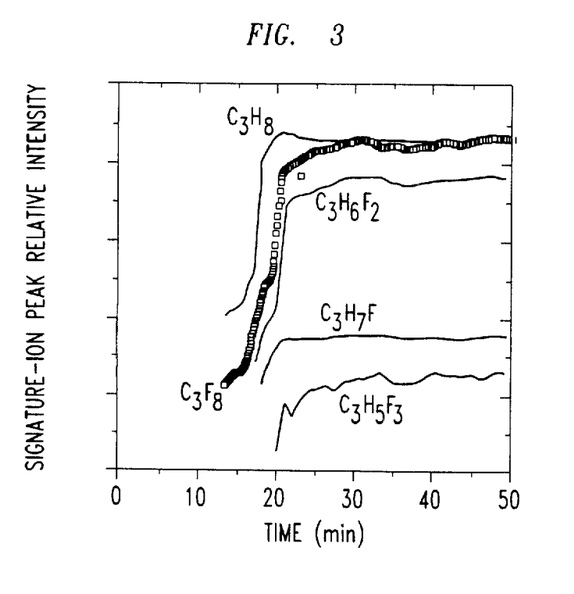
FIG. 3 illustrates mass spectrometry data as function of time for reduction of $C_3F_8$.

FIG. 3 is a trace of mass spectrometry data as a function of time illustrating the result from introduction of $C_3F_8$ etch-gas (denoted by open squares in the plot) into the reducing agent mixture. The mass spectrometry data showed various reduction products generated (denoted by lines in the plot), corresponding to a mix of partially-reduced (i.e. $C_3F_3H_5$; $C_3F_2H_6$; $C_3FH_7$) and completely-reduced ($C_3H_8$) species. The nature of product species observed were clustered towards the latter stages of reduction and no signals were observed for the lightly-reduced species (i.e. $C_3F_7H$; $C_3F_6H_2$; $C_3F_5H_3$; $C_3F_4H_4$). For the $C_3FH_7$ observed, mass spectrometry data analysis indicated presence of 1-fluoropropane rather than 2-fluoropropane, which was consistent with the molecular modeling computation (see FIG. 2B), where removal of the central fluorine was predicted to generate the more stable carbanion product.

An estimate of the breakdown efficiency for the parent PFC/HFC was made from a measure of the relative decrease in characteristic peak intensities in the absence and presence of the chemical reducing agent. For $C_3F_8$, this estimate corresponded to ~70% reaction efficiency.

Analysis via ion chromatography of the reaction residue precipitated from solution indicated presence of Na+, $NH_4$+ and F−. Under certain reaction conditions, very low levels of organic by-products (primarily fluorine-substituted oligomers and various, branched/linear amines and diol species) were also observed. However, the predominant reaction path appeared to be C—F reduction to C—H and the principal reaction products generated contained the total and partially reduced PFC/HFC species. $CH_4$ generated from $CF_4$ was observed.

EXAMPLES 3 THROUGH 5

Comparison of the abatement effects of the electrochemical system with and without the weak acid, i.e., the ethanol, were performed.

EXAMPLE 3

Figure 4A:
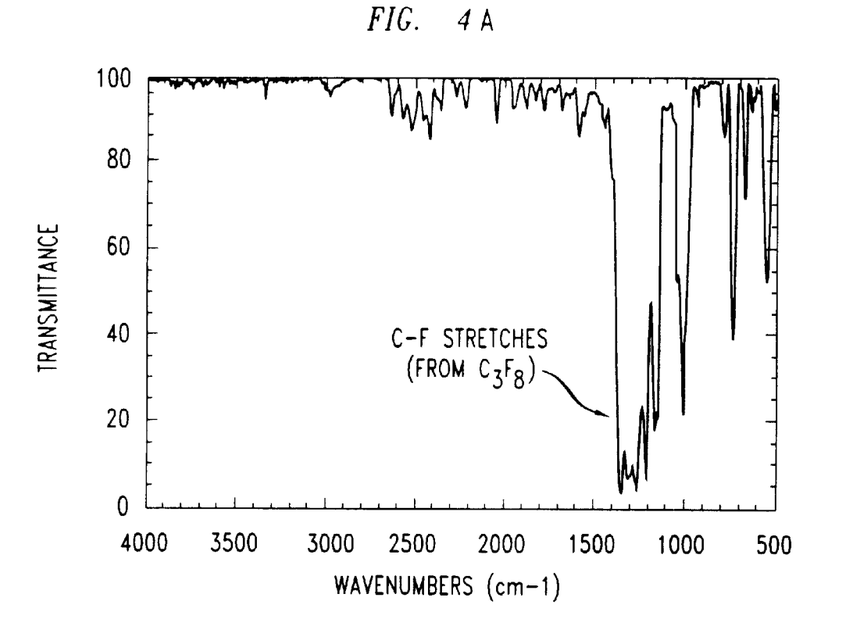
FIGS. 4A and 4B illustrate infrared spectrometry data for abatement according to the invention, for systems with and without the weak acid.
Figure 4B:
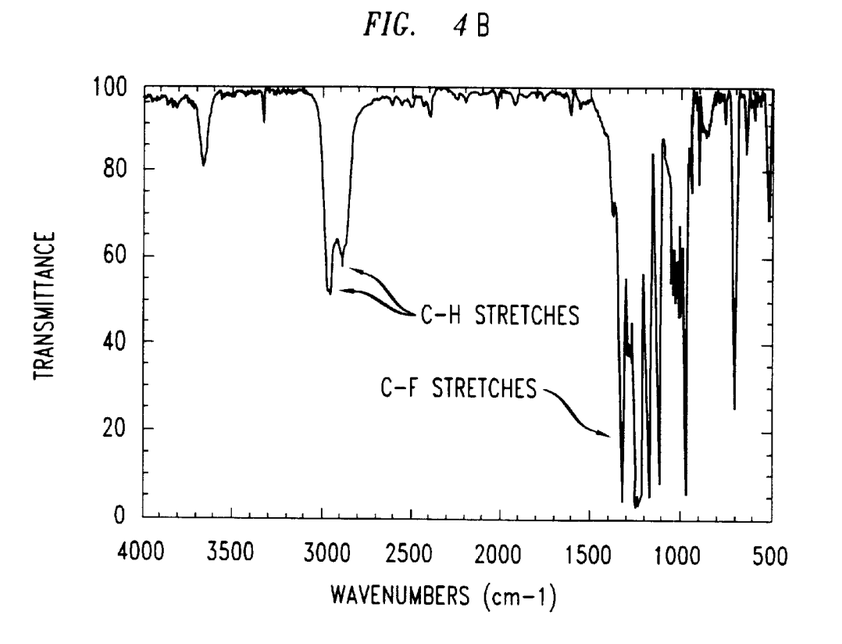

FIGS. 4A and 4B show infrared spectroscopy taken according to the procedure above for $C_3F_8$, for abatement systems without ethanol (FIG. 4A) and with ethanol (FIG. 4B). Inclusion of the weak acid clearly had a significant effect. FIG. 4A showed very little decomposition of C—F to C—H. By contrast, FIG. 4B showed that inclusion of the weak acid provided substantial decomposition to C—H bonds.

EXAMPLE 4

Figure 5A:
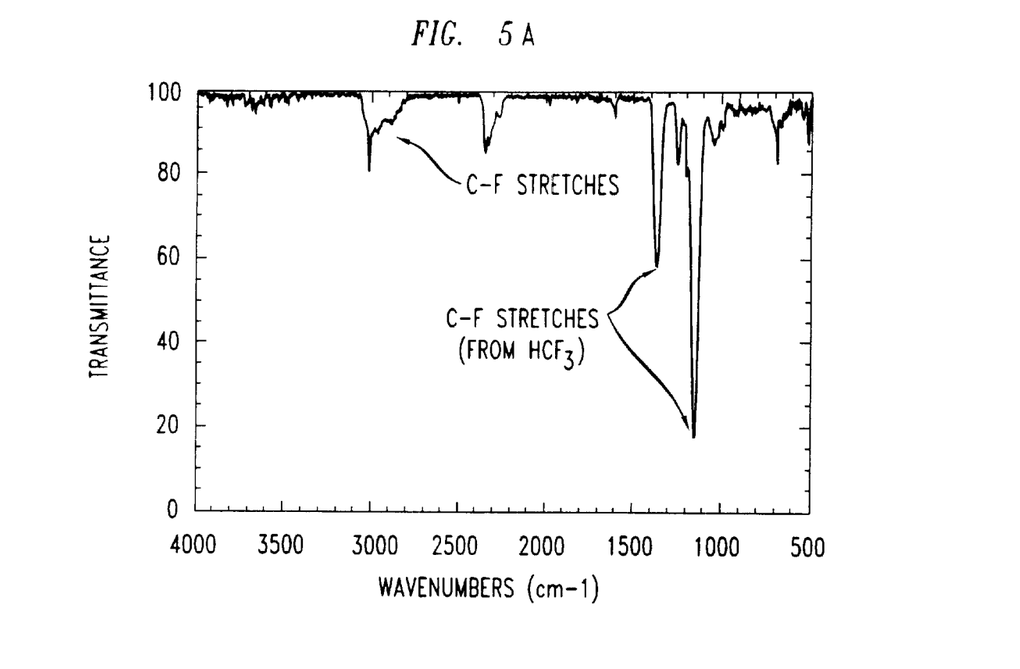
FIGS. 5A and 5B illustrate infrared spectrometry data for abatement according to the invention, for systems with and without the weak acid.
Figure 5B:
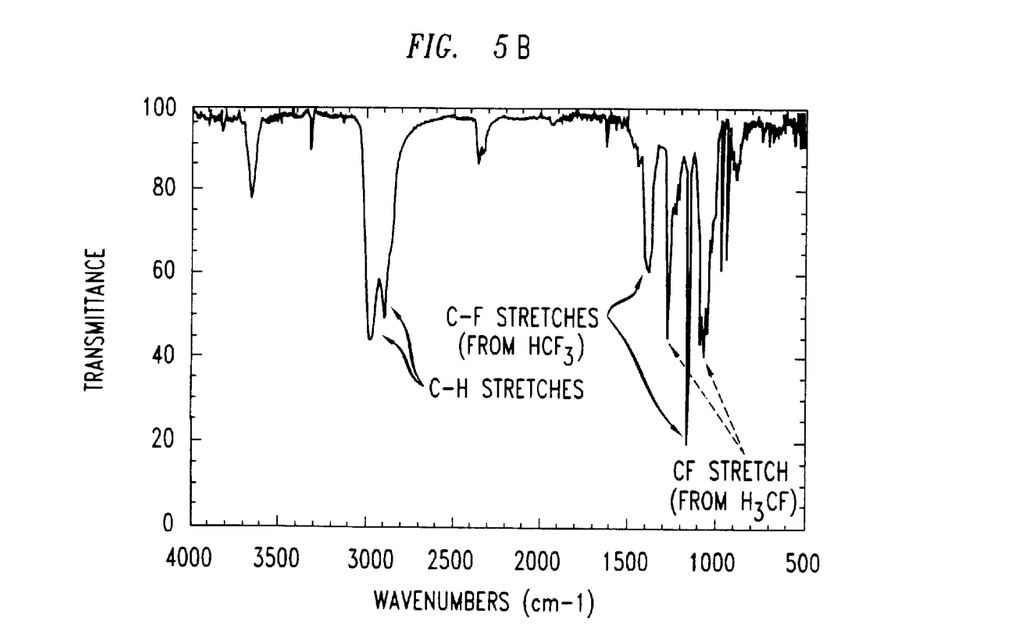

FIGS. 5A and 5B show infrared spectroscopy taken according to the procedure above for $HCF_3$, for abatement systems without ethanol (FIG. 5A) and with ethanol (FIG. 5B). Inclusion of the weak acid clearly had a significant effect. FIG. 5A showed some decomposition of C—F to C—H. By contrast, FIG. 5B showed that inclusion of the weak acid provided substantially more decomposition to C—H bonds.

EXAMPLE 5

Figure 6A:
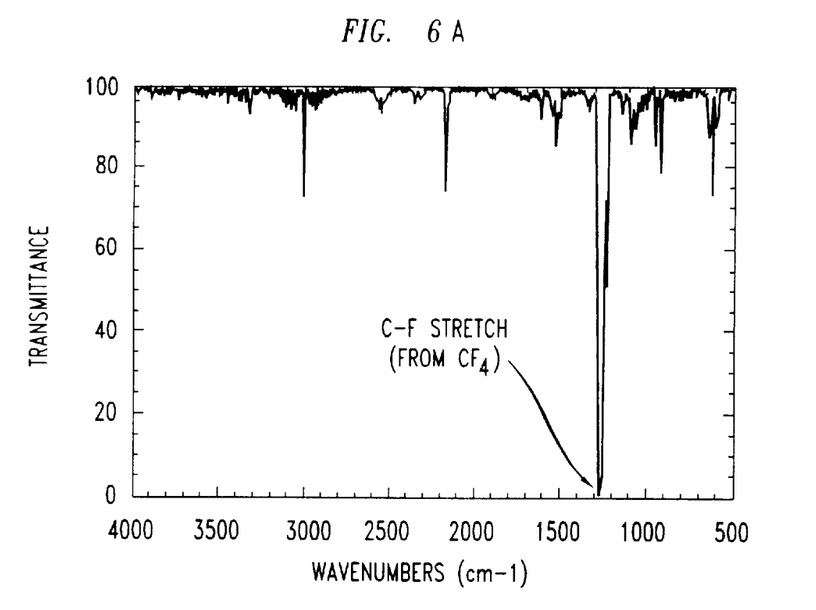
FIGS. 6A and 6B illustrate infrared spectrometry data for abatement according to the invention, for systems with and without the weak acid.
Figure 6B:
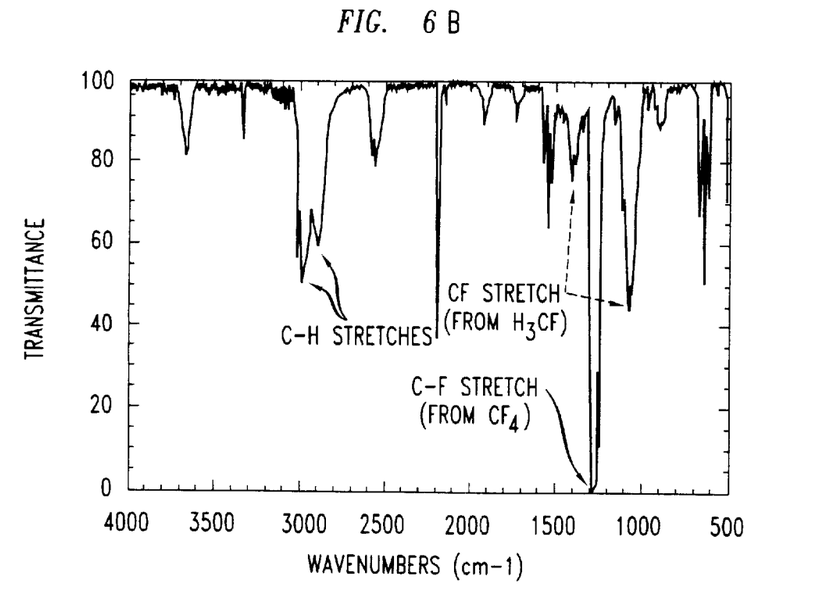

FIGS. 6A and 6B show infrared spectroscopy taken according to the procedure above for $CF_4$, for abatement systems without ethanol (FIG. 6A) and with ethanol (FIG. 6B). Inclusion of the weak acid clearly had a significant effect. FIG. 6A showed a small amount of decomposition of C—F to C—H. By contrast, FIG. 6B showed that inclusion of the weak acid provided substantial decomposition to C—H bonds. This was a significant result, given that $CF_4$ has been found to be the most difficult PFC/HFC to abate using current state-of-the-art processes, e.g., combustion and micro-plasma destruction.

Other embodiments of the invention will be apparent to those skilled in the art from consideration of the specification and practice of the invention disclosed herein.

What is claimed is:

1. A process for abatement of perfluorinated or hydrofluorinated compounds, comprising the step of:
   interacting at least one gaseous perfluorinated or hydrofluorinated compound with a liquid system comprising an alkali metal, a dissolution agent, and a weak acid proton donor different than the dissolution agent, such that decomposition of at least a portion of the at least one gaseous perfluorinated or hydrofluorinated compound is performed.

2. The process of claim 1, wherein the alkali metal is selected from the group consisting of lithium, potassium, and sodium.

3. The process of claim 2, wherein the alkali metal is sodium and the sodium is present in the liquid system in a form selected from the group consisting of sodium potassium alloy, sodium biphenyl, sodium borohydride, sodium benzophenone, and a molten sodium dispersion.

4. The process of claim 1, wherein the dissolution agent is ammonia or a low molecular weight aliphatic primary or secondary amine.

5. The process of claim 1, wherein the weak acid proton donor is selected from the group consisting of alcohols and amines.

6. The process of claim 5, wherein the alcohol is an aliphatic alcohol.

7. The process of claim 5, wherein the alcohol is ethanol or t-butanol.

8. The process of claim 1, wherein the system comprises sodium, ammonia, and ethanol.

9. The process of claim 1, wherein the at least one perfluorinated or hydrofluorinated compound comprises at least one compound selected from the group consisting of $CF_4$, $C_2F_6$. $C_3F_8$, and $HCF_3$.

10. The process of claim 1, wherein the liquid system further comprises one or more non-reactive co-solvents.

11. The process of claim 1, wherein the reaction efficiency of the process is at least 70%.

12. The process of claim 1, wherein the interaction is performed in a fluidized bed.

13. The process of claim 12, wherein the fluidized bed is vertically-oriented, utilizes cocurrent flow, and utilizes gas-liquid-solid interaction.

14. The process of claim 13, wherein the solid phase is introduced batchwise into the liquid phase and wherein the fluidize bed system is arranged such that solids charging and discharging is dependent on the liquid flow.

15. The process of claim 12, wherein the fluidized bed is vertically oriented, utilizes cocurrent flow, and utilizes gas-liquid interaction with substantially no solid interaction.

\* \* \* \* \*